(12) United States Patent
Nishimura et al.

(10) Patent No.: US 10,160,354 B2
(45) Date of Patent: Dec. 25, 2018

(54) VEHICLE AIR-CONDITIONING SEAT

(71) Applicant: TOYOTA BOSHOKU KABUSHIKI KAISHA, Aichi-ken (JP)

(72) Inventors: Seiya Nishimura, Aichi-ken (JP); Fumitoshi Akaike, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 309 days.

(21) Appl. No.: 15/165,172

(22) Filed: May 26, 2016

(65) Prior Publication Data

US 2016/0347217 A1    Dec. 1, 2016

(30) Foreign Application Priority Data

May 26, 2015 (JP) .................................. 2015-106637

(51) Int. Cl.
*B60N 2/56* (2006.01)

(52) U.S. Cl.
CPC ......... *B60N 2/5635* (2013.01); *B60N 2/5657* (2013.01); *B60N 2/5685* (2013.01)

(58) Field of Classification Search
CPC ... B60N 2/5635; B60N 2/5657; B60N 2/5685
USPC ........................................ 297/180.13, 180.14
See application file for complete search history.

(56) References Cited

U.S. PATENT DOCUMENTS

| | | | | |
|---|---|---|---|---|
| 6,062,641 A | * | 5/2000 | Suzuki ..................... | A47C 7/74 297/180.1 |
| 6,224,150 B1 | * | 5/2001 | Eksin .................. | B60N 2/5635 297/180.1 |
| 7,506,938 B2 | * | 3/2009 | Brennan .................. | A47C 7/74 297/180.13 |
| 7,828,050 B2 | * | 11/2010 | Esaki ................. | B60H 1/00285 165/202 |

(Continued)

FOREIGN PATENT DOCUMENTS

| JP | 63-045651 | 3/1988 |
|---|---|---|
| JP | 2003-237354 | 8/2003 |

(Continued)

OTHER PUBLICATIONS

Office Action for Japanese Patent Application No. 2015-106637 dated Oct. 2, 2018, along with English translation.

*Primary Examiner* — Milton Nelson, Jr.
(74) *Attorney, Agent, or Firm* — Greenblum & Bernstein, P.L.C.

(57) ABSTRACT

A vehicle air-conditioning seat comprising a blower and a heater therein, wherein at least one of a temperature adjustment region whose temperature is configured to be adjusted by the blower and a temperature adjustment region whose temperature is configured to be adjusted by the heater is divided into a plurality of regions, wherein the vehicle air-conditioning seat has a cool mode where temperature adjustment is performed only by the blower, a heat mode where the temperature adjustment is performed only by the heater, and a mixed mode where the temperature adjustment (Continued)

is performed by both of the blower and the heater, and wherein, in the mixed mode, the temperature adjustment is performed for each divided region by varying at least one of a blowing amount by the blower and a heating amount by the heater for each divided region.

3 Claims, 7 Drawing Sheets

(56) References Cited

U.S. PATENT DOCUMENTS 8,662,579 B2 * 3/2014 Yoshizawa ........... B60N 2/5657
　　　　　　　　　　　　　　　　　　　　　297/180.13

FOREIGN PATENT DOCUMENTS

| JP | 2004-268848 | 9/2004 |
| JP | 2008-273404 | 11/2008 |
| JP | 2012-224122 | 11/2012 |

* cited by examiner

VEHICLE AIR-CONDITIONING SEAT

CROSS-REFERENCE TO RELATED APPLICATIONS

This application claims priority from Japanese Patent Application No. 2015-106637 filed on May 26, 2015, the entire contents of which are incorporated herein by reference.

TECHNICAL FIELD

The present disclosure relates to a vehicle air-conditioning seat having a blower and a heater therein.

BACKGROUND

A vehicle air-conditioning seat having a blower and a heater therein is disclosed in JP-A-2003-237354, for example. In JP-A-2003-237354, an electric heater and a blowing unit are incorporated in the interior of a seat back and a seat cushion, respectively. A seat cover can be heated by the electric heater, and at the same time, the blowing air of the blowing unit can be blown-out from a blow-out opening provided in the seat cover. At this time, in order to prevent an occupant from feeling that the seat is too hot or too cold by the vehicle cabin environment, a heating amount by the electric heater and a blowing amount from the blowing unit can be respectively adjusted by one operation means.

That is, the vehicle air-conditioning seat disclosed in JP-A-2003-237354 basically has two modes of a cool mode mainly using the blowing unit and a heat mode mainly using the electric heater. In addition, in order to prevent superheating or supercooling in each mode, the blowing unit or the electric heater is auxiliarily used in combination, as necessary. In JP-A-2003-237354, the temperature in the entire surface of the seat cushion and the seat back is uniformly adjusted.

In this kind of vehicle air-conditioning seat, the cool mode is used in summer and the heat mode is used in winter. The vehicle air-conditioning seat is hardly used in spring or autumn. When the vehicle air-conditioning seat is used in spring or autumn, an occupant's body becomes too cold or stuffy, thereby causing discomfort. In JP-A-2003-237354, the supercooling in the cool mode and the superheating in the heat mode can be avoided depending on the vehicle cabin environment. However, JP-A-2003-237354 does not go beyond the range of the cool mode and the heat mode, and hence, the vehicle air-conditioning seat is assumed to be hardly used in spring or autumn. Accordingly, the advantage of mounting the vehicle air-conditioning seat cannot be sufficiently utilized.

SUMMARY

Aspects of the present disclosure provide a vehicle air-conditioning seat having a mode which can be comfortably used also in spring or autumn.

According to an aspect of the disclosure, there is provided a vehicle air-conditioning seat comprising a blower and a heater therein, wherein at least one of a temperature adjustment region whose temperature is configured to be adjusted by the blower and a temperature adjustment region whose temperature is configured to be adjusted by the heater is divided into a plurality of regions, wherein the vehicle air-conditioning seat has a cool mode where temperature adjustment is performed only by the blower, a heat mode where the temperature adjustment is performed only by the heater, and a mixed mode where the temperature adjustment is performed by both of the blower and the heater, and wherein, in the mixed mode, the temperature adjustment is performed for each divided region by varying at least one of a blowing amount by the blower and a heating amount by the heater for each divided region.

DETAILED DESCRIPTION

Figure 1:
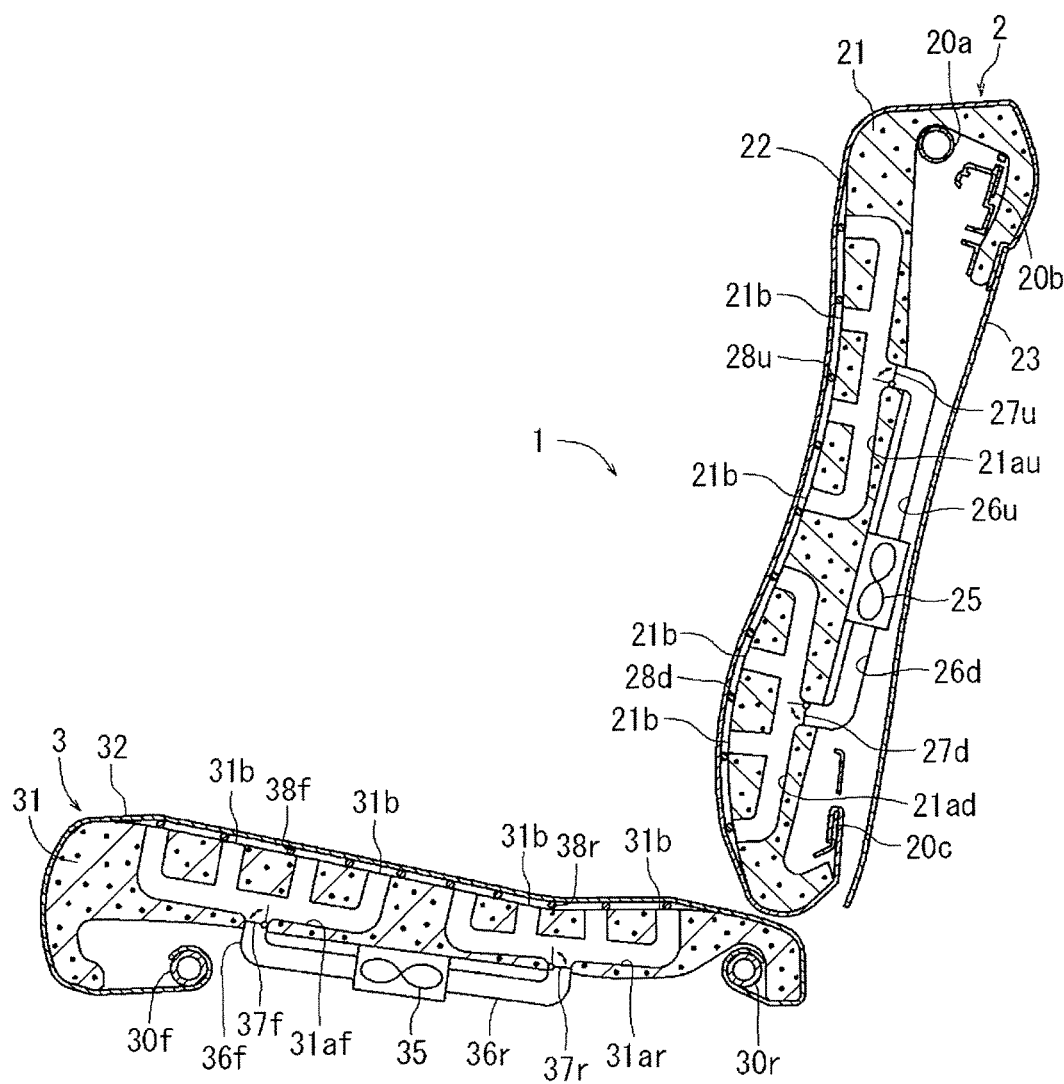
FIG. 1 is a schematic sectional view of a vehicle air-conditioning seat.

An air-conditioning seat of the present disclosure can be applied to seats of various vehicles such as a train such as a tram or a Shinkansen, an airplane and a vessel, in addition to a vehicle such as an automobile. An air-conditioning seat 1 of the present embodiment has a seat back 2 serving as a backrest of an occupant and a seat cushion 3 serving as a seating portion of the occupant, as shown in FIG. 1 and the like.

The seat back 2 has a back frame constituting a framework and made of metal, a back pad 21 serving as a cushion material and made of foam resin, and a back cover 22 for covering an outer surface of the back pad 21. An upper frame 20*a*, an upper panel 20*b* and a lower frame 20*c* of the back frame are shown in FIG. 1 and the like. The upper frame 20*a* integrally connects upper ends of left and right side frames (not shown) to each other. The upper panel 20*b* is installed between the upper ends of the left and right side frames (not shown). The lower frame 20*c* is installed between lower ends of the left and right side frames (not shown). A reference numeral 23 represents a rear panel covering a rear surface of the seat back 2 and made of synthetic resin.

A blowing fan 25 as a blower is incorporated in the interior of the seat back 2. Specifically, the blowing fan 25 is arranged at an internal space between the back pad 21 and the rear panel 23. The blowing fan 25 can be fixedly installed to the back pad 21 or the rear panel 23. Alternatively, the blowing fan 25 may be fixed to a portion of the back frame by using a dedicated bracket or stay, etc. The blowing fan 25 is not particularly limited, so long as it can be driven by energization to forcibly flow gas. Specifically, any one of an air supply (blow-out) fan or an intake (suction) fan may be used. Alternatively, a fan where air supply and intake can be switched may be used. Although not shown, the blowing fan 25 is electrically connected to a power source (battery) via a cable.

In the interior of the back pad 21, a series of air passages are formed in a branched shape over the entire surface direction of the back pad 21. In a front surface (seating surface) of the back pad 21, a plurality of openings 21b communicating with the air passages is formed on the entire front surface. Here, in the present embodiment, the air passages are divided into two upper and lower regions in order to separate a temperature adjustment region by the blowing fan 25. Specifically, the air passages are divided into an upper air passage 21au for adjusting the temperature of an upper region of the seat back 2 and a lower air passage 21ad for adjusting the temperature of a lower region of the seat back 2. The upper air passage 2l au corresponds to the surroundings of an occupant's scapula. The lower air passage 21ad corresponds to the surroundings of an occupant's waist. The upper air passage 21au and the lower air passage 21ad are independent of each other. The upper air passage 2l au and the lower air passage 21ad communicate with the blowing fan 25 via an upper duct 26u and a lower duct 26d, respectively. In the interior of the upper duct 26u and the lower duct 26d, a shutter 27u and a shutter 27d for switching a communicating state and a cut-off state of the upper duct 26u and the lower duct 26d are disposed respectively. The switching of the shutter 27u and the shutter 27d is controlled by an air-conditioning control device.

The back cover 22 is made of a leather material or a fabric. When the back cover 22 is made of the leather material, there is no air permeability, and hence, a large number of small holes are formed on the entire surface to secure the air permeability. When the back cover 22 is made of the fabric, the air permeability is secured by the gaps between fibers, and hence, there is no need to purposely provide small holes.

Figure 2:
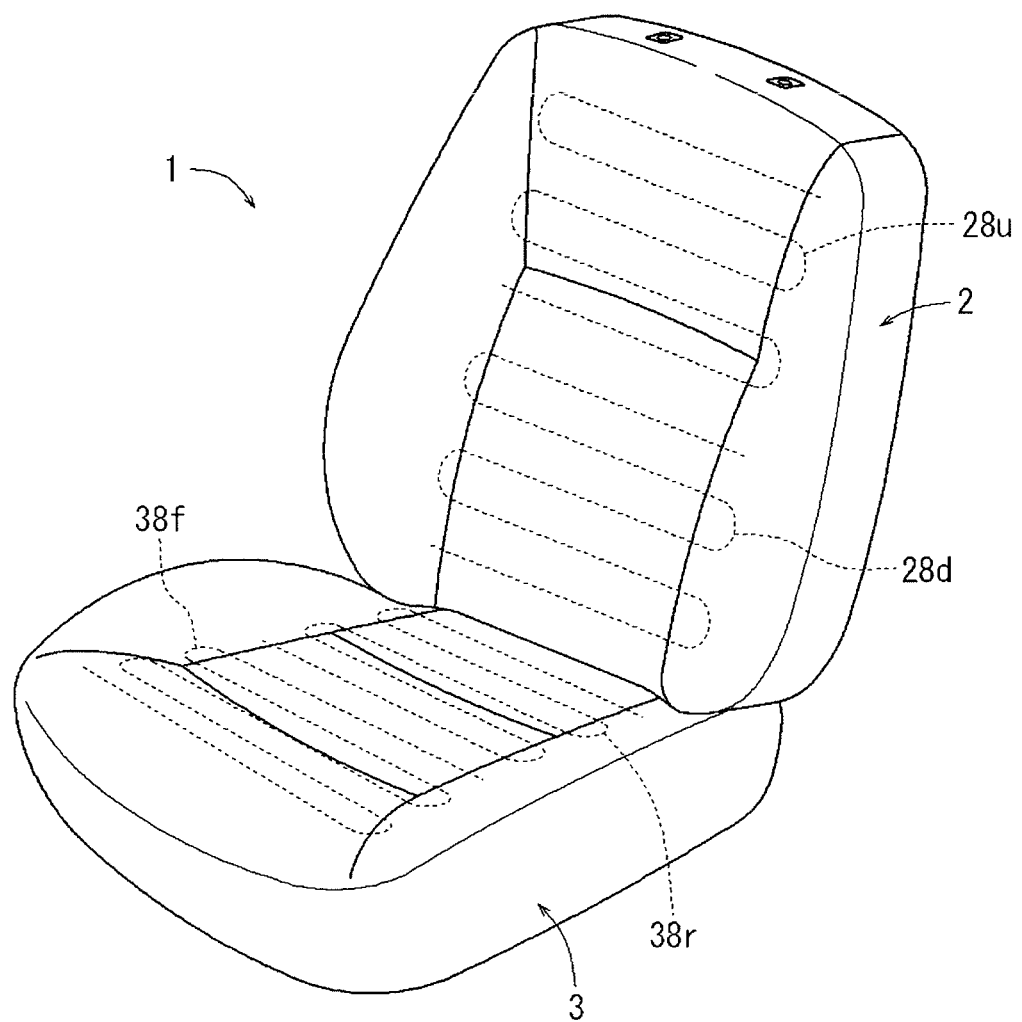
FIG. 2 is a perspective view of the vehicle air-conditioning seat.

A heater is provided between the back pad 21 and the back cover 22. A heating wire which generates heat by energization can be suitably used as the heater. The heating wire is routed on the entire front surface of the seat back 2. In the present embodiment, the heating regions by the heater are also divided into two upper and lower regions. Specifically, as shown also in FIG. 2, the heater is divided into an upper heater 28u for adjusting the temperature of an upper region of the seat back 2 and a lower heater 28d for adjusting the temperature of a lower region of the seat back 2. The upper heater 28u corresponds to the surroundings of an occupant's scapula, together with the upper air passage 21au. The lower heater 28d corresponds to the surroundings of an occupant's waist, together with the lower air passage 21ad. The upper heater 28u and the lower heater 28d are independent of each other. Although not shown, the upper heater 28u and the lower heater 28d are electrically connected to a power source (battery: not shown) via a cable, respectively.

Referring back to FIG. 1, the seat cushion 3 has a cushion frame constituting a framework and made of metal, a cushion pad 31 serving as a cushion material and made of foam resin, and a cushion cover 32 for covering an outer surface of the cushion pad 31. A front pipe 30f and a rear pipe 30r of the cushion frame are shown in FIG. 1 and the like. The front pipe 30f is installed between front end as of the left and right side frames (not shown). The rear pipe 30r is installed between rear ends of the left and right side frames (not shown). A front edge of the cushion cover 32 is locked to the front pipe 30f. A rear edge of the cushion cover 32 is locked to the rear pipe 30r.

A blowing fan 35 as a blower is incorporated in the interior of the seat cushion 3. Specifically, the blowing fan 35 is arranged in a lower space of the cushion pad 31. The blowing fan 35 may be fixedly installed to the cushion pad 31, or, may be fixed to a portion of the cushion frame by using a dedicated bracket or stay, etc. The same one as the blowing fan 25 used in the seat back 2 may be used as the blowing fan 35. Although not shown, the blowing fan 35 is electrically connected to a power source (not shown) via a cable.

In the interior of the cushion pad 31, a series of air passages are formed in a branched shape over the entire surface direction of the cushion pad 21. In an upper surface (seating surface) of the cushion pad 31, a plurality of openings 31b communicating with the air passages is formed on the entire upper surface. Here, in the present embodiment, the air passages are divided into two front and rear regions in order to separate a temperature adjustment region by the blowing fan 35. Specifically, the air passages are divided into a front air passage 31af for adjusting the temperature of a front region of the seat cushion 3 and a rear air passage 31ar for adjusting the temperature of a rear region of the seat cushion 3. The front air passage 31af corresponds to the surroundings of an occupant's thigh. The rear air passage 31ar corresponds to the surroundings of an occupant's hip. The front air passage 31af and the rear air passage 31ar are independent of each other. The front air passage 31af and the rear air passage 31ar communicate with the blowing fan 35 via a front duct 36f and a rear duct 36r, respectively. In the interior of the front duct 36f and the rear duct 36r, a front shutter 37f and a rear shutter 37r for switching a communicating state and a cut-off state of the front duct 36f and the rear duct 36r are disposed respectively. The switching of the front shutter 37f and the rear shutter 37r is controlled by the air-conditioning control device.

The same one as the back cover 22 may be used as the cushion cover 32. Further, a heater is provided between the cushion pad 31 and the cushion cover 32. A heating wire which generates heat by energization can be suitably used as the heater. The heating wire is routed on the entire upper surface of the seat cushion 3. Further, in the present embodiment, the heating regions by the heater are also divided into two front and rear regions. Specifically, as shown also in FIG. 2, the heater is divided into a front heater 38f for adjusting the temperature of a front region of the seat cushion 3 and a rear heater 38r for adjusting the temperature of a rear region of the seat cushion 3. The front heater 38f corresponds to the surroundings of an occupant's thigh, together with the front air passage 31af. The rear heater 38r corresponds to the surroundings of an occupant's hip, together with the rear air passage 31ar. The front heater 38f and the rear heater 38r are independent of each other. Although not shown, the front heater 38f and the rear heater 38r are electrically connected to a power source (not shown) via a cable, respectively.

The air-conditioning control device includes a well-known microcomputer composed of a CPU, ROM and RAM, etc., and peripheral circuits thereof. A control program for controlling the air-conditioning is stored in the ROM. The CPU executes various computations on the RAM, based on the control program stored in the ROM.

The air-conditioning of the air-conditioning seat 1 can be carried out by an operation switch (not shown) corresponding to each mode. The operation switch can be provided in the side of the air-conditioning seat 1 or an instrument panel, etc. Alternatively, the air-conditioning seat may be configured to be operated on a display screen of a car navigation system. Operation signal from each operation switch is inputted to the air-conditioning control device. Based on the operation signal inputted, necessary operation signal is outputted from the air-conditioning control device to the blowing fans 25, 35 or the heaters 28u, 28d, 38f, 38r, etc.

In the present embodiment, a cool mode where an occupant's sensible temperature is adjusted only by the blowing fans 25, 35, a heat mode where the occupant's sensible temperature is adjusted only by the heaters 28, 38, and a mixed mode where the cool mode and the heat mode are used in combination in some regions are set.

Figure 3:
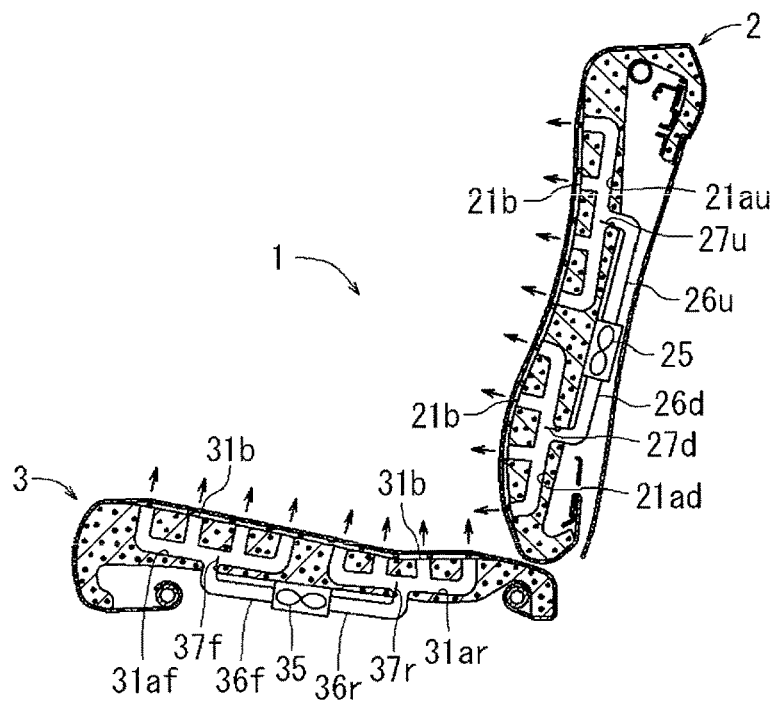
FIG. 3 is a schematic view showing a cool mode of the vehicle air-conditioning seat.

The cool mode is a mode that is mainly used in summer. As shown in FIG. 3, in the cool mode, all of the shutters 27u, 27d, 37f, 37r are opened. In this way, all of the ducts 26u. 26d, 36f, 36r are in the communicating state. Then, both of the blowing falls 25, 35 are driven. Thus, air flows in all of the openings 21b, 31b through each of the air passages 21au, 21ad, 31af, 31ar. In this way, an occupant feels the coolness over the entire seating surface of the seat back 2 and the seat cushion 3.

Here, the operation switch for the cool mode may be provided with a strong and weak button or a dedicated operation dial or the like, so that a flow rate of air may be changed. Further, the blowing fans 25, 35 may be an air supply fan or an intake fan. That is, the blowing fans 25, 35 may be configured such that air is blown-out from the openings 21b, 31b or sucked from the openings 21b, 31b. The reason is that, in either case, the occupant feels coolness. In FIGS. 3 to 11 showing respective modes, an aspect where air is blown-out from the openings 21b, 31b is illustrated.

Figure 4:
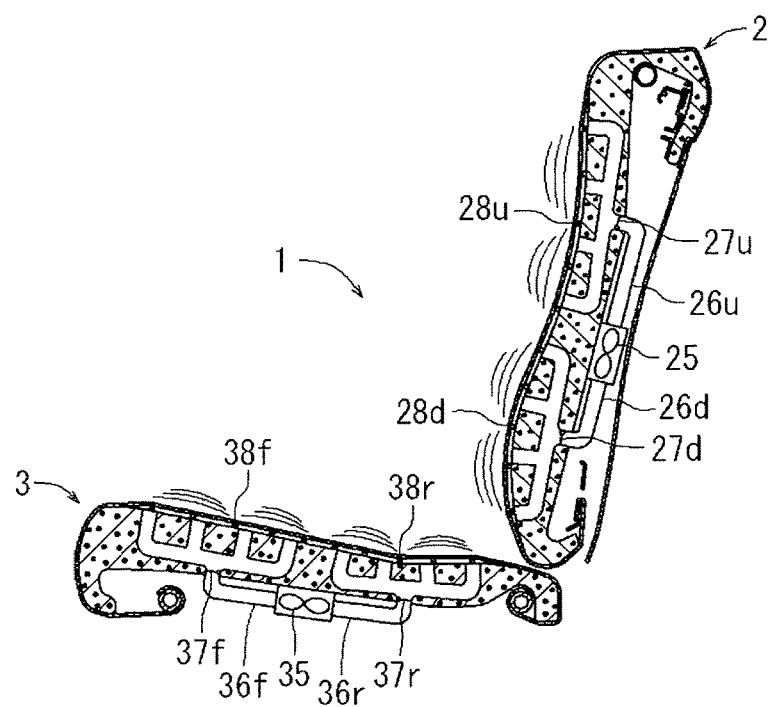
FIG. 4 is a schematic view showing a heat mode of the vehicle air-conditioning seat.

The heat mode is a mode that is mainly used in winter. As shown in FIG. 4, in the heat mode, all of the shutters 27u, 27d, 37f, 37r are closed and all of the ducts 26u, 26d, 36f, 36r are cut off. Then, all of the heaters 28u, 28d, 38f, 38r are energized. In this way, the entire seating surface of the seat back 2 and the seat cushion 3 is heated, so that an occupant feels warmth. Here, also in the heat mode, the operation switch for the heat mode may be provided with a strong and weak button or a dedicated operation dial or the like, so that the amount of heating may be changed.

Figure 5:
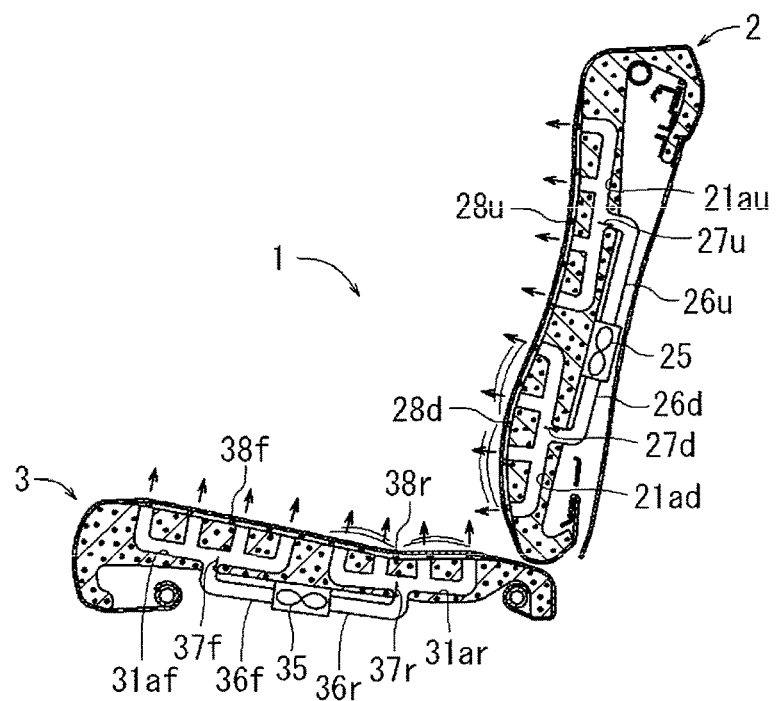
FIG. 5 is a schematic view showing a cold-prevention mode of the vehicle air-conditioning seat.

As the mixed mode, for example, a cold-prevention mode as shown in FIG. 5 can be set. The cold-prevention mode is a mode that is used in a relatively warm period in spring or autumn. In the cold-prevention mode, basically, the cool mode is mainly used and the heater is used in combination in some regions. Specifically, the air-conditioning is performed over the entire seating surface of the seat back 2 and the seat cushion 3, and the lower heater 28d provided in the lower region of the seat back 2 and the rear heater 38r provided in the rear region of the seat cushion 3 are energized. In this way, the supercooling is prevented in the portion from the waist to the hip of the occupant. Therefore, it is possible to comfortably use the air-conditioning function without the discomfort that an occupant's body is cooled more than necessary.

Figure 6:
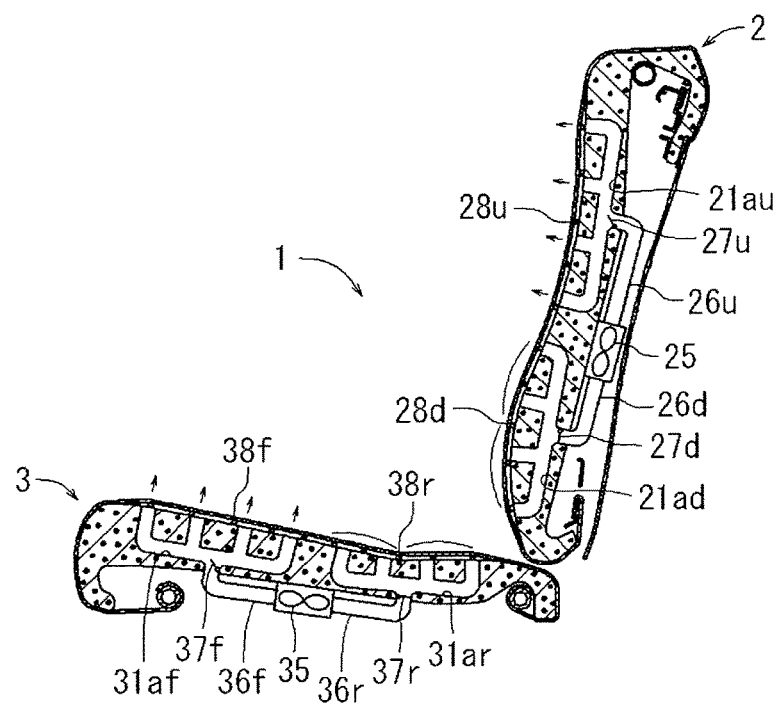
FIG. 6 is a schematic view showing a weak cold-prevention mode of the vehicle air-conditioning seat.

Also in the cold-prevention mode, a strong and weak mode can be set by a strong and weak button or the like. For example, when a weak cold-prevention mode is set, as shown in FIG. 6, the amount of air-conditioning is suppressed in the upper region of the seat back 2 and the front region of the seat cushion 3 whereas the air-conditioning is stopped in the lower region of the seat back 2 and the rear region of the seat cushion 3. For this purpose, the opening amount of the upper duct 26u and the front duct 36f may be suppressed by the upper shutter 27u and the front shutter 37f. On the other hand, the lower duct 26d and the rear duct 36r are still closed by the lower shutter 27d and the rear shutter 37r. Instead, the air-conditioning seat can be configured to be slightly heated by supplying a small amount of electricity to the lower heater 28d and the rear heater 38r.

Figure 7:
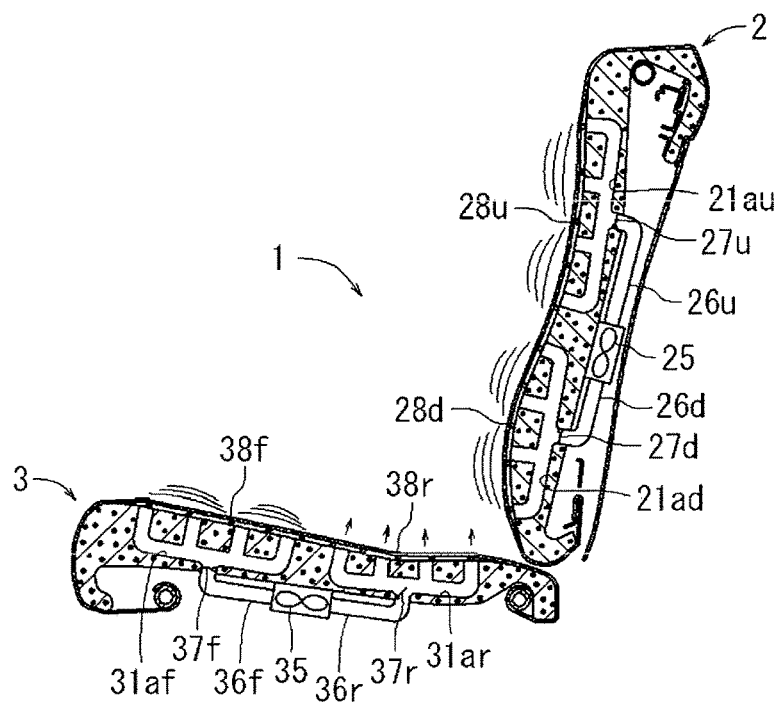
FIG. 7 is a schematic view showing a stuffiness-prevention mode of the vehicle air-conditioning seat.

Further, as the mixed mode, a stuffiness-prevention mode may be set. The stuffiness-prevention mode is a mode that is used in a relatively cool period in spring or autumn. In the stuffiness-prevention mode, basically, the heat mode is mainly used and the air-conditioning by the blower is used in combination in some regions. For example, as shown in FIG. 7, the entire seating surface of the seat back 2 and the front region of the seat cushion 3 are heated by the heaters 28u, 28d and 38f, respectively. On the other hand, the rear region of the seat cushion 3 is air-conditioned by the blowing fan 35. At this time, the ducts 26u, 26d, 36f are cut off by the shutters 27u, 27d, 37f and only the rear duct 36r is communicated by the rear shutter 37r. In this way, while an occupant basically feels the warmth, only the hip which becomes easily stuffy is air-conditioned, and therefore, an occupant can comfortably use the air-conditioning function.

Figure 8:
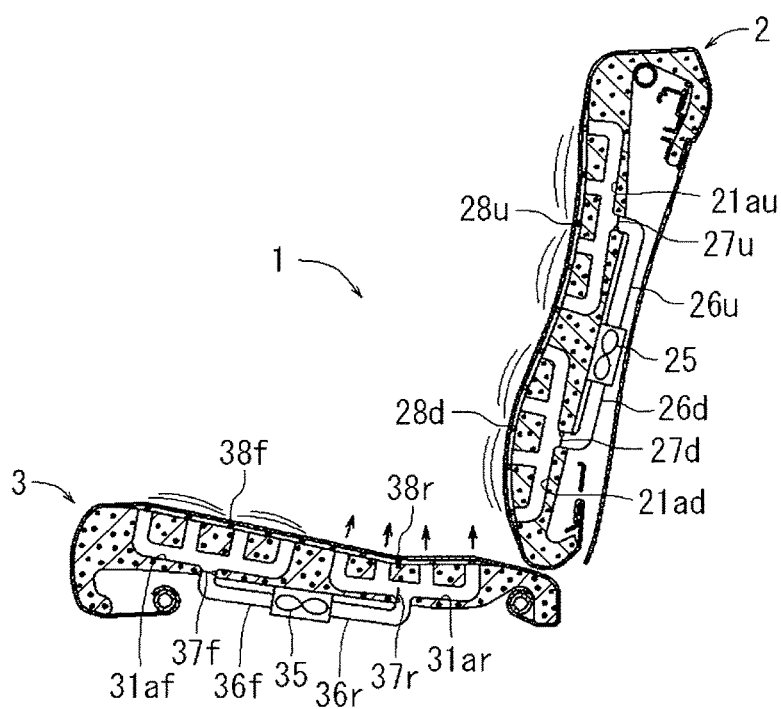
FIG. 8 is a schematic view showing a strong stuffiness-prevention mode of the vehicle air-conditioning seat.
Figure 9:
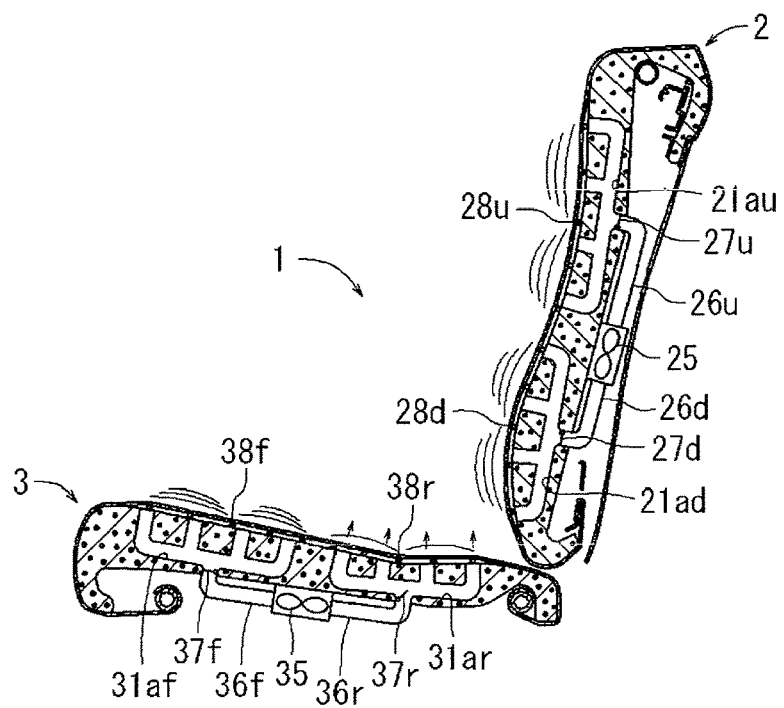
FIG. 9 is a schematic view showing a weak stuffiness-prevention mode of the vehicle air-conditioning seat.

Further, also in the stuffiness-prevention mode, a strong and weak mode can be set by a strong and weak button or the like. For example, when a strong stuffiness-prevention mode is set, as shown in FIG. 8, it is possible to increase the ventilation amount from the blowing fan 35 while suppressing the heating amount by the heaters 28u, 28d, 38f. In this way, the stuffiness-prevention effect is increased. On the other hand, when a weak stuffiness-prevention mode is set, for example, as shown in FIG. 9, slight air-conditioning and slight heating can be used in combination in the rear region of the seat cushion 3. In this way, it is possible to suppress the stuffiness-prevention function.

Figure 10:
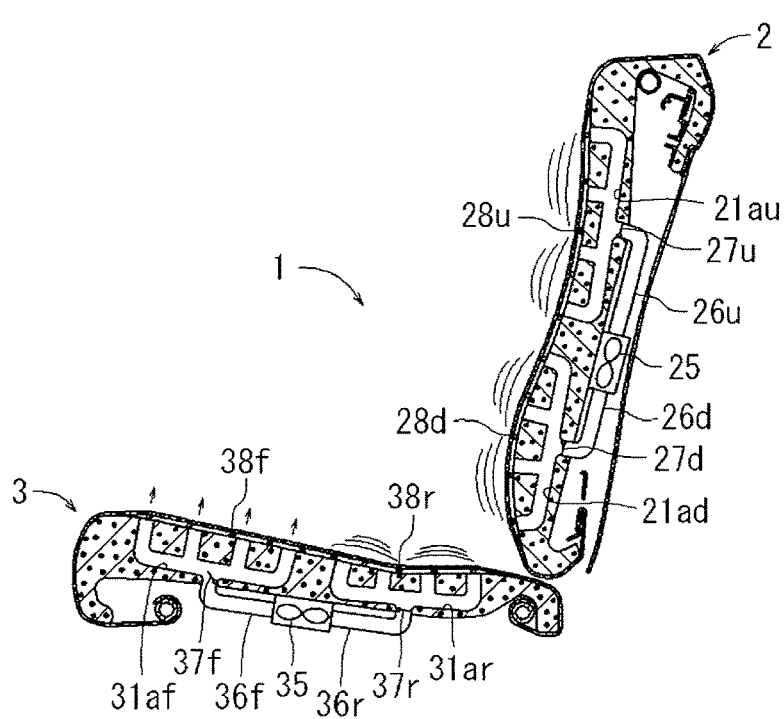
FIG. 10 is a schematic view showing another example of a strong stuffiness-prevention mode of the vehicle air-conditioning seat.

The stuffiness-prevention mode may be set such that the portion other than the hip is prevented from being stuffy. For example, as shown in FIG. 10, in order to prevent the surroundings of the thigh of the occupant from being stuffy, the stuffiness-prevention mode may be set such that only the front portion of the seat cushion 3 is air-conditioned. Further, the stuffiness-prevention mode may be set such that not only one region but also a plurality of regions is simultaneously prevented from being stuffy. For example, as shown in FIG. 11, the stuffiness-prevention mode may be set such that the surroundings of the thigh and the surroundings of the waist of the occupant are simultaneously air-conditioned.

Figure 11:
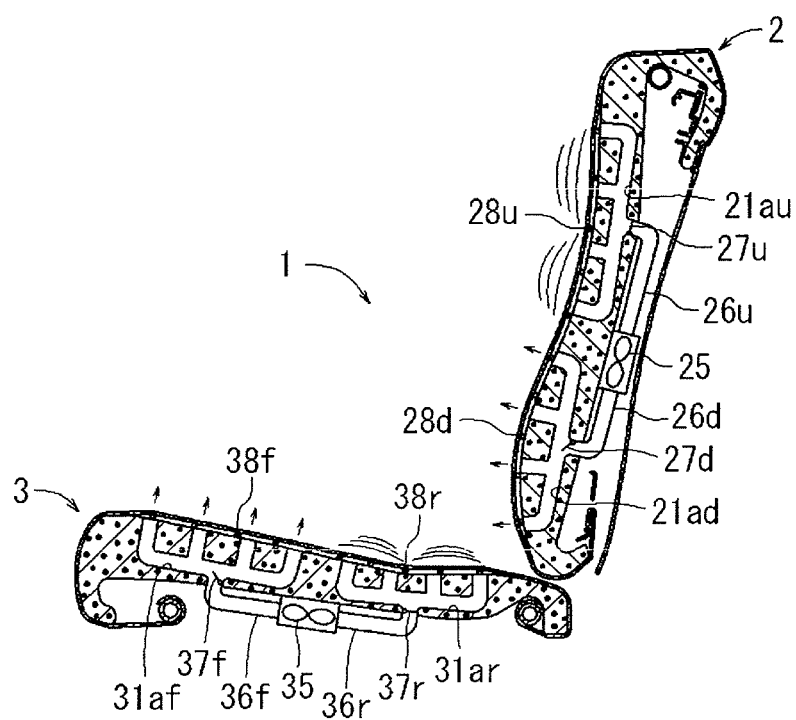
FIG. 11 is a schematic view showing yet another example of strong stuffiness-prevention mode of the vehicle air-conditioning seat.

In addition, the mixed mode is not limited to the aspects shown in FIGS. 5 to 11 but can have various combinations. In this case, whether an occupant feels a cool sensible temperature or a warm sensible temperature is determined depending on whether the sensible temperature is higher or lower than the body temperature. Therefore, this may be set as a reference. Further, the mixed mode may be set such that the states shown in FIGS. 7, 10 and 11 are automatically switched at regular intervals.

Further in the above embodiment the seating surface of the seat back 2 or the seat cushion 3 is divided into two regions. However, the seating surface of the seat back 2 or the seat cushion 3 may be finely divided into three or more regions. In this case, the number of regions divided in the seat back 2 may be different from the number of regions divided in the seat cushion 3. It is sufficient that at least one of a temperature adjustment region by the blowing fans and a temperature adjustment region by the heaters is divided into a plurality of regions. Therefore, any one of the temperature adjustment regions by the blowing fans or the temperature adjustment regions by the heaters may not be divided. Further, in the above embodiment, one blowing fan 25, 35 is shared in a plurality of regions. However, a blower may be provided for each divided region. In this case, a shutter for opening and closing each duct is not required.

The disclosure provides illustrative, non-limiting aspects as follows:

According to an aspect of the disclosure, there is provided a vehicle air-conditioning seat comprising a blower and a heater therein, wherein at least one of a temperature adjustment region whose temperature is configured to be adjusted by the blower and a temperature adjustment region whose temperature is configured to be adjusted by the heater is divided into a plurality of regions, wherein the vehicle air-conditioning seat has a cool mode where temperature adjustment is performed only by the blower, a heat mode where the temperature adjustment is performed only by the heater, and a mixed mode where the temperature adjustment is performed by both of the blower and the heater, and wherein, in the mixed mode, the temperature adjustment is performed for each divided region by varying at least one of a blowing amount by the blower and a heating amount by the heater for each divided region.

Accordingly, the vehicle air-conditioning seat has the mixed mode where the temperature adjustment is performed by a combination of the blower and the heater, in addition to the cool mode where the temperature adjustment is performed only by the blower and the heat mode where the temperature adjustment is performed only by the heater. Therefore, the mixed mode where the temperature adjustment is performed for each region according to the season can be comfortably used also in spring or autumn, while using the cool mode in summer and the heat mode in winter as in the related art. That is, since the vehicle air-conditioning seat can be comfortably used also in spring or autumn, the advantage of mounting the vehicle air-conditioning seat can be utilized sufficiently.

What is claimed is:

1. A vehicle air-conditioning seat comprising a blower and a heater therein,
   wherein at least one of a temperature adjustment region whose temperature is configured to be adjusted by the blower and a temperature adjustment region whose temperature is configured to be adjusted by the heater is divided into a plurality of regions,
   wherein the vehicle air-conditioning seat has a cool mode where temperature adjustment is performed only by the blower, a heat mode where the temperature adjustment is performed only by the heater, and a mixed mode where the temperature adjustment is performed by both of the blower and the heater, and
   wherein, in the mixed mode, the temperature adjustment is performed for each divided region by varying at least one of a blowing amount by the blower and a heating amount by the heater for each divided region.

2. The vehicle air-conditioning seat according to claim 1, wherein the mixed mode includes a cold-prevention mode where the cool mode by the blower is performed and the heater is used in combination with the blower in some regions of the plurality of regions.

3. The vehicle air-conditioning seat according to claim 1, wherein the mixed mode includes a stuffiness-prevention mode where the heat mode by the heater is performed and the blower is used in combination with the heater in some regions of the plurality of regions.

* * * * *